(12) United States Patent
Mildner et al.

(10) Patent No.: US 9,365,243 B2
(45) Date of Patent: Jun. 14, 2016

(54) PLASTIC COMPONENT CARRIER FOR FRONT MOUNTING OF A MOTOR VEHICLE BODY

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/528,881

(22) Filed: Oct. 30, 2014

(65) Prior Publication Data

US 2015/0115664 A1 Apr. 30, 2015

(30) Foreign Application Priority Data

Oct. 30, 2013 (DE) ...................... 20 2013 009 615 U

(51) Int. Cl.
| | |
|---|---|
| *B62D 25/00* | (2006.01) |
| *B62D 25/08* | (2006.01) |
| *B62D 29/04* | (2006.01) |
| *B62D 29/00* | (2006.01) |

(52) U.S. Cl.
CPC ............ *B62D 25/084* (2013.01); *B62D 25/082* (2013.01); *B62D 29/001* (2013.01); *B62D 29/043* (2013.01)

(58) Field of Classification Search
CPC .. B62D 25/084; B62D 25/082; B62D 25/001; B62D 25/043
USPC ............................ 296/187.09, 193.09, 203.02
See application file for complete search history.

(56) References Cited

U.S. PATENT DOCUMENTS

| | | | |
|---|---|---|---|
| 6,547,317 B1 | 4/2003 | Cheron et al. | |
| 7,967,373 B2 | 6/2011 | Ritz | |
| 2010/0253102 A1* | 10/2010 | Riviere | ................... B60R 19/12 |
| | | | 293/121 |
| 2013/0021814 A1 | 1/2013 | Tanaka | |
| 2013/0026791 A1* | 1/2013 | Huber | ..................... B60R 19/02 |
| | | | 296/193.09 |
| 2014/0062141 A1 | 3/2014 | Townson et al. | |

FOREIGN PATENT DOCUMENTS

| | | |
|---|---|---|
| DE | 19919258 A1 | 11/2000 |
| DE | 102008018316 A1 | 10/2009 |
| DE | 102012021746 A1 | 6/2013 |
| WO | 2012073621 A1 | 6/2012 |

OTHER PUBLICATIONS

Great Britain Patent Office, Great Britain Search Report for Great Britain Application No. 1418328.9, dated Mar. 31, 2015.

* cited by examiner

*Primary Examiner* — Joseph D Pape
(74) *Attorney, Agent, or Firm* — Ingrassia Fisher & Lorenz PC

(57) ABSTRACT

The present disclosure relates to a front mounting of a motor vehicle body, having a lock cross member extending in the transverse vehicle direction (y), which is connected to a left and a right side member, each of which extends in the lengthwise direction of the vehicle (x), and having an elongated plastic component carrier constructed as a single part, and which is directly or indirectly connected or fastened by a left and a right fastening section to the side members, and which further comprises an elongated connecting section positioned between the fastening sections and constructed integrally therewith, which connection section is located ahead of the lock cross member with reference to the direction of travel of the motor vehicle.

20 Claims, 5 Drawing Sheets

PLASTIC COMPONENT CARRIER FOR FRONT MOUNTING OF A MOTOR VEHICLE BODY

CROSS REFERENCE TO RELATED APPLICATION

This application claims priority to German Patent Application No. 202013009615.2 filed Oct. 30, 2013, which is incorporated herein by reference in its entirety.

TECHNICAL FIELD

The technical field relates to a front mounting of a motor vehicle body, having a plastic component carrier for attaching and securing various components in the front area of the motor vehicle.

BACKGROUND

The front mounting of a self-supporting motor vehicle body typically includes two side members arranged at a distance from one another in the direction transverse to the direction of travel of the vehicle (y) and each extending in the direction of travel of the vehicle (x). The front ends thereof are typically connected to each other structurally via a yoke-like upper cross member. The upper cross member, which is may also be referred to as a lock cross member, is typically used for mounting and fastening a lock for the hood.

As such the upper cross member is typically positioned higher than the plane formed by the side members relative to the vertical axis of the vehicle (z). It is braced against lateral supports on the front ends of the side members. The front ends of the side members are also connected to a bumper cross member via cashboxes or impact boxes. The bumper cross member is typically positioned at the same height as the front ends of the side members.

The upper cross member is not only intended to serve as something to which a hood lock is attached and secured, it can also function as a support element for various attachments or motor vehicle components that are to be mounted in the front area of the motor vehicle. However, the constraints of the installation space layout in the motor vehicle means that attachments or motor vehicle components, for example mountings for hood bumper rubbers or a pivoting hood rod and an engine air intake to be provided in the front area, for example, as well as other fastening points for front headlamp modules cannot be fastened directly to the upper cross member. Accordingly, separate fastening structures must be provided and mounted separately on the upper cross member, to accommodate such motor vehicle components or attachments, such as a bumper cladding panel.

A front end module for a vehicle body that includes a mounting support for accommodating attached units is disclosed in DE 199 19 258 A1. The mounting support is made from plastic and fitted with metal reinforcing panels which are attached to the outside or embedded in the mounting support for added strength in high load areas. End areas of the reinforcing panels connected to the mounting support are connected both to a bumper carrier underneath and to a superimposed upper cross member above. The bumper carrier, the reinforcing members and the upper cross member then form a crash frame that is fixed to the lower side member and the upper side member of the vehicle body.

In this context, there is a need to provide a simpler, easily manufactured mounting arrangement for vehicle components and attachments in the motor vehicle front area. As far as possible, such a front mounting should also be lighter and take up less space, and should also be inexpensive to make.

SUMMARY

The present disclosure provides a front mounting of a motor vehicle body provided in this context and includes an upper cross member that extends essentially in the transverse direction (y) of the vehicle. The upper cross member is connected structurally to a side member of the vehicle body on the left and one on the right, each of which extends in the longitudinal direction of the vehicle (x). The front mounting further includes an elongated plastic component carrier which is made from a single part, and is directly or indirectly connected or fastened by a left and a right fastening section to the side members that are positioned opposite one another. The plastic component carrier further includes an elongated connecting section positioned between the fastening sections and constructed integrally therewith.

The connecting section is located in front of the upper cross member in the direction of travel of the motor vehicle. In such an arrangement, the connecting section is separate, particularly in the lengthwise direction of the vehicle. In other words, a gap is formed between the connecting section and the upper cross member. The left and right fastening sections are also constructed integrally with the connecting section, which is positioned between them. In this way, the connecting section and the left and right fastening sections can be adapted to fit perfectly in the upper cross member.

In order to provide an indirect connection between the plastic component carrier and the side members, the plastic component carrier may also be fastened to the upper cross member, and in particular rest on the upper cross member, at least at a certain point. At the same time, the upper cross member is arranged and secured on the side members either directly or by means of suitable legs, extending substantially in the vertical direction of the vehicle (z). In this manner, the upper cross member serves to create an indirect or second degree connection between the plastic component carrier and the side members.

The fastening sections of the plastic component carrier are constructed as a single part, joined via the connecting section, and thus connected to one another. Arranging and fastening a fastening section on a fastening point provided on the upper cross member for this purpose also enables the other fastening section to be moved to its intended mounting position. When the connecting section of the plastic component carrier is shifted ahead of the upper cross member in the direction of travel of the vehicle, and is thus positioned in front of the upper cross member, the fastening section may be used particularly for mounting motor vehicle components or attachments, such as a bumper cladding panel. For this purpose, the bumper cladding panel must be fastened at a distance from the upper cross member and connected to the upper cross member indirectly, via the plastic component carrier.

According to a further variant, the connecting section of the plastic component carrier includes a support extending in the vertical direction of the vehicle (z) for bracing against a bumper transverse member. This support thus provides additional bracing for the connecting section, and consequently the plastic component carrier as well, on the bumper cross member. In particular, this also offers additional support for the connecting section of the plastic component carrier as it extends forward from the upper cross member. Thus, the plastic component carrier may be directly supported at several spatially separate locations on the upper cross member and on the bumper cross member. These multiple support points for bearing components of the front mounting mean that the plastic component carrier can be of relatively delicate construction, with resulting economies in weight and space.

According to a further variant, the support, which is constructed as a single part with the connecting section, is arranged approximately equidistantly between the fastening sections. Consequently, the support and the connecting section may form a T-shaped structure. Because of the central position of the support between the fastening sections, the plastic component carrier may be supported directly on the front mounting of the motor vehicle body in at least three positions. In particular, the connecting section of the plastic component carrier, which is substantially parallel to but at a distance from the upper cross member may be structurally stabilized via the central bracing point on the bumper cross member created by the support.

According to a further variant, the plastic component carrier includes lateral stabilizers, one on the right and one on the left, each of which extend outwards, that is to say in the direction transverse to the vehicle, from the right and left connecting sections of the plastic component carrier. Each of the lateral stabilizers also has an end section at the farthest end from the fastening section of the plastic component carrier, via which the left and right lateral stabilizers can be fastened to the left and right wheel mounting struts on the front mounting.

The lateral stabilizers are typically positioned to slope outwards and backwards, which means they extend in a plane (x, y) defined by the lengthwise direction of the vehicle and the transverse direction of the vehicle. The lateral stabilizers and their fastening on the wheel mounting struts may also provide the plastic component carrier further support on the front mounting of the motor vehicle body. The lateral stabilizers may also provide additional stiffening for the vehicle body itself. The lateral stabilizers, which typically extend between the outer end sections of the upper cross member and the wheel mounting struts, may thus also provide a structural connection between the upper cross member and the wheel mounting struts. The torsional rigidity of the front mounting may be improved and increased thereby.

The lateral stabilizers, the fastening sections and the connecting section extending between the left and right fastening sections, are constructed as a single part or integrally. The plastic component carrier may include a thermoplastic plastic or it may be manufactured essentially from a plastic of such kind. The plastic component carrier may also include fiber reinforcement or it may be of hybrid construction, that is to say it may include metal inserts or metal surface elements.

According to a further variant, the lateral stabilizers extending between the wheel mounting struts and the connecting section of the plastic component carrier are reinforced by at least one metal insert. Consequently, the lateral stabilizers may provide a very strong structural connection between the upper cross member and the wheel mounting struts. Or other heavily stressed areas of the plastic component carrier, or at least portions thereof, may be locally reinforced, either by a relatively thick-walled design or by the provision of fiber or metal reinforcing elements.

According to a further variant, the fastening sections of the plastic component carrier enclose the sides of the upper cross member, and the plastic component carrier is then typically connected to the side members and fastened thereto via the upper cross member. In particular, the fastening sections are arranged relative to one another in such manner that they enclose the upper cross member between them, as the upper cross member extends longitudinally from the point of view of the direction transverse to the vehicle (y). Thus, the fastening sections of the plastic component carrier lie flush against the upper lateral outer borders of the upper cross member. The outer borders or outer corners of the upper cross member, which are otherwise exposed, can be stabilized and strengthened by means of the lateral stabilizers of the plastic component carrier adjacent to the fastening sections and the connection thereof to the wheel mounting struts.

The at least partial lateral enclosure of the upper, outer border of the upper cross member also makes it easier to mount the plastic component carrier. This simply has to be mounted by placing the opposing left and right fastening sections on the corresponding outer and upper border sections of the upper cross member. Since the plastic component carrier is constructed integrally or as a single part, this means that all other sections of the plastic component, such as the lateral stabilizers, the connecting section and the support therefor, may already be present in a final mounting configuration.

In a refinement of the plastic component carrier, each fastening section is equipped with a mounting bracket, which is supported by a top side and a front side of the upper cross member. A defined, local bearing area of the plastic component carrier on the upper cross member may be created via the fastening brackets provided on the left and right fastening sections, and consequently defined respectively as the left and right brackets. With the fastening brackets, the plastic component carrier may be aligned with regard to the vertical direction of the vehicle and also shifted on the upper cross member relative in the lengthwise direction of the vehicle. The fastening brackets may also be used to create at least a single, and possibly also a double fastening of the plastic component carrier to the upper cross member. Thus, both an upper and a front leg of the fastening bracket of the fastening sections are connected individually to the upper and front sides of the upper cross member. Detachable joining elements, such as screws, clipping detent connectors, are provided for this purpose. The fastening bracket and the upper cross member may also be furnished with matching screw holes and/or weld nuts to facilitate such a connection.

According to a further variant, each fastening section of the plastic component carrier includes a radiator mounting. These are used to mount and support a motor vehicle radiator. The motor vehicle radiator may thus be secured in or on the front mounting via the one-piece plastic component carrier. The one-piece design of the plastic component carrier and the consequent integration of the radiator mounting in the fastening section concerned means that it is no longer necessary to provide a separate arrangement for attaching a radiator mounting. In this way, the mounting for the motor vehicle radiator may be integrated in the plastic component carrier. This also leads to a reduction in parts used.

In a refinement to the above, the radiator mounting is constructed as an extension that projects from the bottom edge of the fastening bracket. The radiator mounting extends forward in the travel direction of the vehicle from a front, typically downwardly extending leg of the fastening bracket. The radiator mounting thus makes contact typically underneath connecting section of the plastic component carrier. However, it may also make contact between the connecting section and the fastening section of the plastic component carrier relative to the direction of travel of the motor vehicle (x).

According to a further variant, an air intake for the vehicle engine is conformed in the connecting section of the plastic component carrier. The air intake is integrated in the plastic component carrier, and accordingly it is constructed as a single part with the fastening section of the plastic component carrier. In this context, it is conceivable for only one shell of half of an air intake forming an air flow channel to be conformed on the connecting section, while another shell, complementary or corresponding thereto, may be connected to the air intake shell conformed in the connecting section possibly after the plastic component carrier has been fitted. With the integration of the air intake in the plastic component carrier, a separate operation for fitting and fastening the air intake in the front area of the motor vehicle body can also be dispensed with. The manufacturing effort and corresponding assembly costs as well as the number of parts required may thus advantageously be reduced still further.

According to a further variant, the connecting section extending between the fastening sections includes multiple attachment points for a bumper cladding panel. The connecting section serves in particular as a support for the bumper cladding panel. In particular, the connecting section, which is typically made entirely from plastic, may include a plurality of fastening points distributed along the connecting section in the form of fastening apertures. Plastic dowels or clips and/or fastening screws, for example, may be screwed into such fastening apertures to secure the bumper cladding panel.

The connecting section may particularly have a C-shaped cross section, with a downwardly open profile, which may be adapted to the contour of the bumper cladding panel that is to be attached thereto. The bumper cladding panel may thus be supported by the connecting section of the plastic component carrier practically along the entire length thereof. The connecting section may also be furnished with a structure-reinforcing ribbing, located inside the downwardly open C-shaped cross section of the connecting section. A strut-like or honeycomb-like reinforcing structure may be created at practically no additional cost if the plastic component carrier is produced as an injection molded part.

According to a further variant, the component carrier includes multiple mountings or fastening sections for more attachments, for example a motor vehicle headlamp module, a pivoting hood rod that can be locked in a resting position, or for various hood buffer rubbers. Fastening sections for soft elastic hood buffer rubbers may be designed to protrude at least slightly upwardly from the fastening sections and/or the lateral stabilizers in the vertical direction of the vehicle, and thus have the form of raised socket sections. In this way, no special mountings have to be affixed to the front mounting of the motor vehicle body for hood buffer rubbers or the like. Manufacturing and assembly effort and the number of parts required may thus be considerably reduced by integrating such mountings in the plastic component carrier.

According to a further variant, the plastic component carrier is constructed as an injection molded plastic part. Accordingly, the component carrier can be manufactured particularly efficiently and inexpensively, and in practically any geometric shape. At the same time, it may particularly be provided that the lateral stabilizers of the plastic component carrier are positioned in the main opening direction of an injection molding machine in such manner that they may be demolded without an additional slider in the plastic injection molding machine. However, demolding of the injection molded plastic component carrier is also conceivable, in which the lateral stabilizers are demolded by means of a slider. This enables any metal inserts in the area of the lateral stabilizers to be structurally optimized.

The one-piece construction of the plastic component carrier as an injection molded part also makes it possible to comply with relatively with relatively tight installation and component tolerances. For example, the tolerances of the individual bearing and fastening points of the plastic component carrier relative to each other can be kept very small. As a result, the assembly and installation tolerances during final assembly of the motor vehicle may be advantageously reduced, so that joint and clearance dimensions, between a headlamp module and a bumper cladding panel for example, may be relatively small and precise. The appearance and overall impression of the front view of the motor vehicle may thus be improved and enhanced.

The one-piece construction of the plastic component carrier and the integration of fastening points therein may also help to reduce the number of parts used in the motor vehicle, which has beneficial consequences for production logistics and production costs.

Finally, in another independent aspect, a motor vehicle body is provided in that has a front mounting as described in the preceding including an elongated plastic component carrier. In addition to the above, in a further aspect a motor vehicle having such a front mounting is provided.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
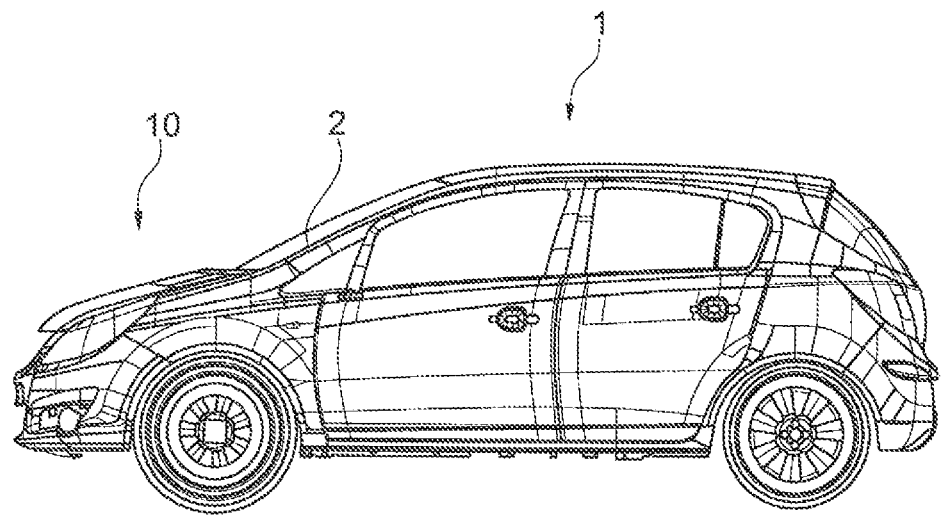
FIG. 1 is a diagrammatic side view of a motor vehicle.
Figure 2:
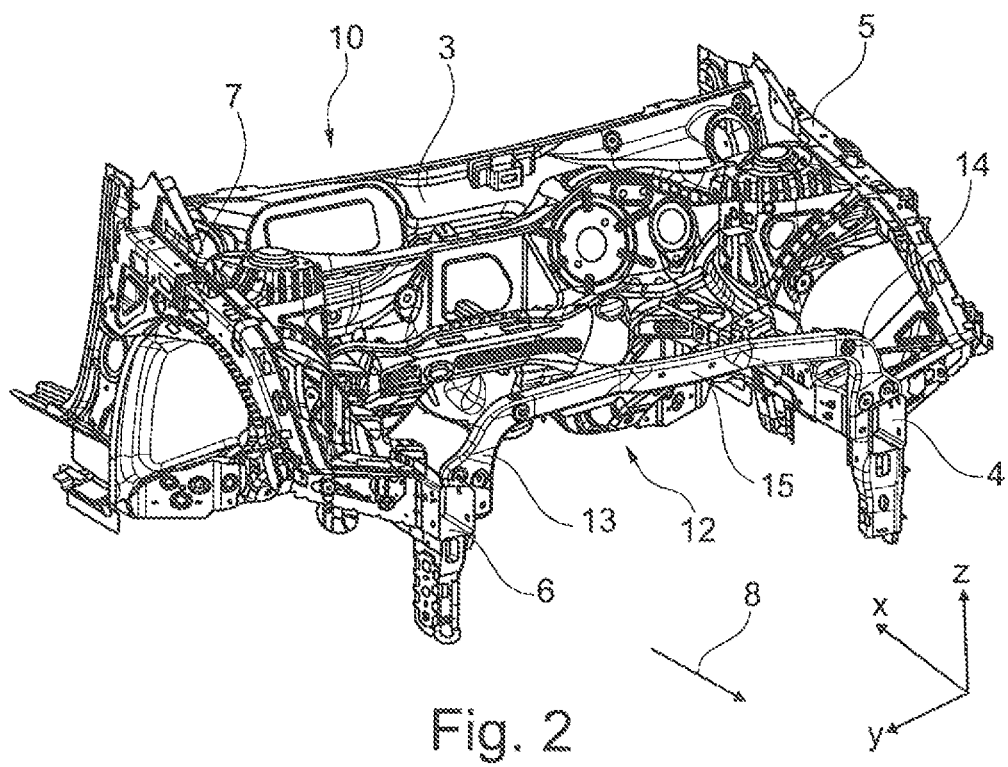
FIG. 2 is a perspective view of a body front mounting without a plastic component carrier.
Figure 3:
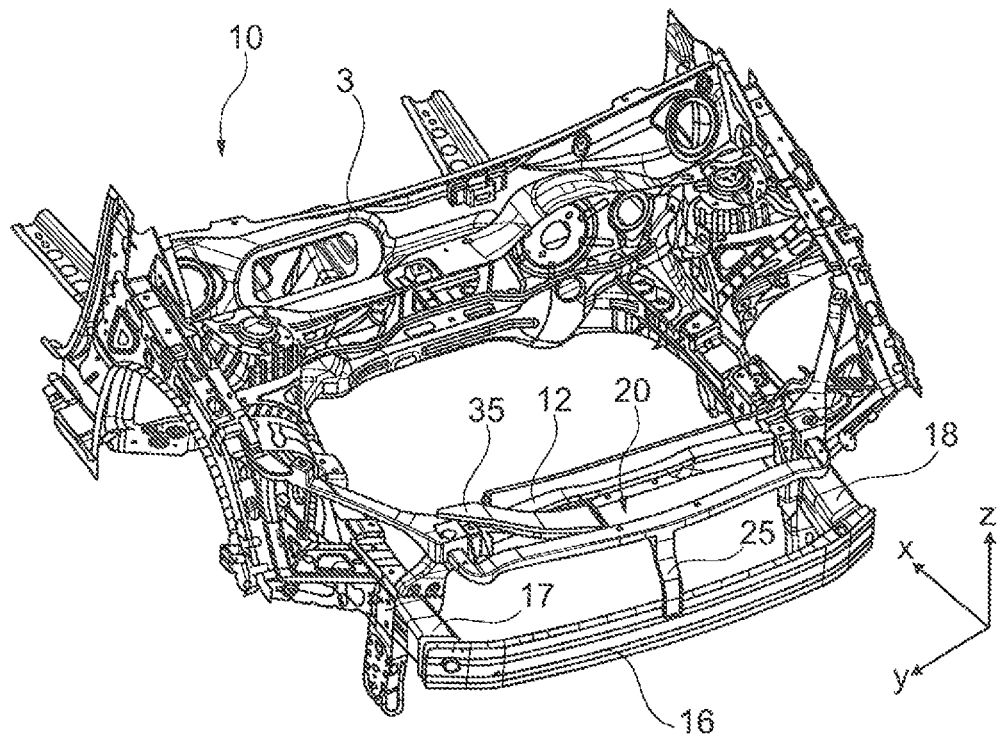
FIG. 3 is another perspective view of the front mounting, with a plastic component carrier arranged thereon.

A motor vehicle 1 shown in side view in FIG. 1 includes a self-supporting motor vehicle body 2 with a front mounting 10, which is shown separately in a perspective view in FIGS. 2 and 3. Front mounting 10 of motor vehicle body 2 has, in particular, two side members 4, 6, each of which extends in the lengthwise direction of the vehicle (x). When viewed in the direction of travel 8 of motor vehicle 1, side members 4, 6 are located in front of a bulkhead 3. Left and right wheel mounting struts 5, 7 are arranged to the side and above the left and right side members 4, 6 respectively, and each extends over a wheel arch designed to accommodate the wheels of the vehicle.

The front ends of side members 4, 6 are structurally connected to each other via an upper cross member 12. Upper cross member 12 includes an elongated middle element 15, which extends between the two lateral side members 4, 6 when viewed in the transverse direction of the vehicle (y). The longitudinal ends of the middle element 15 extending in the transverse direction of the vehicle become lateral supports 13, 14 that are directed downward, and via which upper cross member 12 is ultimately connected to the front ends of left and ride side members 4, 6. Upper cross member 12, particularly the middle element 15 thereof, serves to accommodate and secure the hood lock.

In the illustration of FIG. 3, a front bumper cross member 16 is also shown, and is structurally connected to the front ends of side members 4, 6 via crash boxes 17, 18. Bumper cross member 16 thus extends in front of upper cross member 12. Bumper cross member 16 is also positioned essentially in the plane formed by lateral side members 4, 6, and essentially defined by the vehicle lengthwise direction (x) and vehicle transverse direction (y). The yoke-like upper cross member 12 with its lateral supports 13, 14 projecting essentially in the vertical direction of the vehicle (z) extends in the plane (y, z) defined by the transverse and vertical directions of the vehicle.

Figure 4:
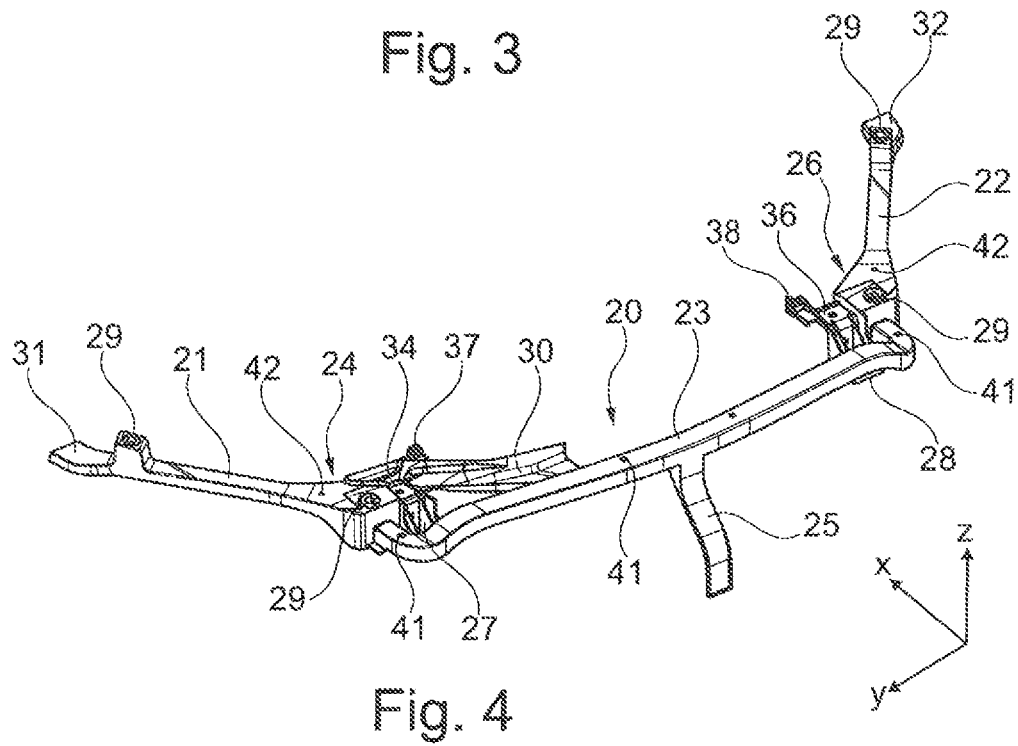
FIG. 4 is a perspective view of the plastic component carrier on its own.

As is also shown in FIG. 3, plastic component carrier 20 as shown separately in FIG. 4 is mounted on upper cross member 12. For this purpose, plastic component carrier 20 includes a left fastening section 26 and a right fastening section 24. Plastic component carrier 20 is supported on upper cross member 12 via the fastening sections 24, 26. As is revealed by a study of FIGS. 2 to 4 together, the left fastening section 26 is braced against a top left side border in the transition area between middle element 15 and left support 14 of upper cross member 12, while the right fastening section 24 constructed almost symmetrically thereto is braced in the transition area between middle element 15 and right support 13 of upper cross member 12.

Figure 8:
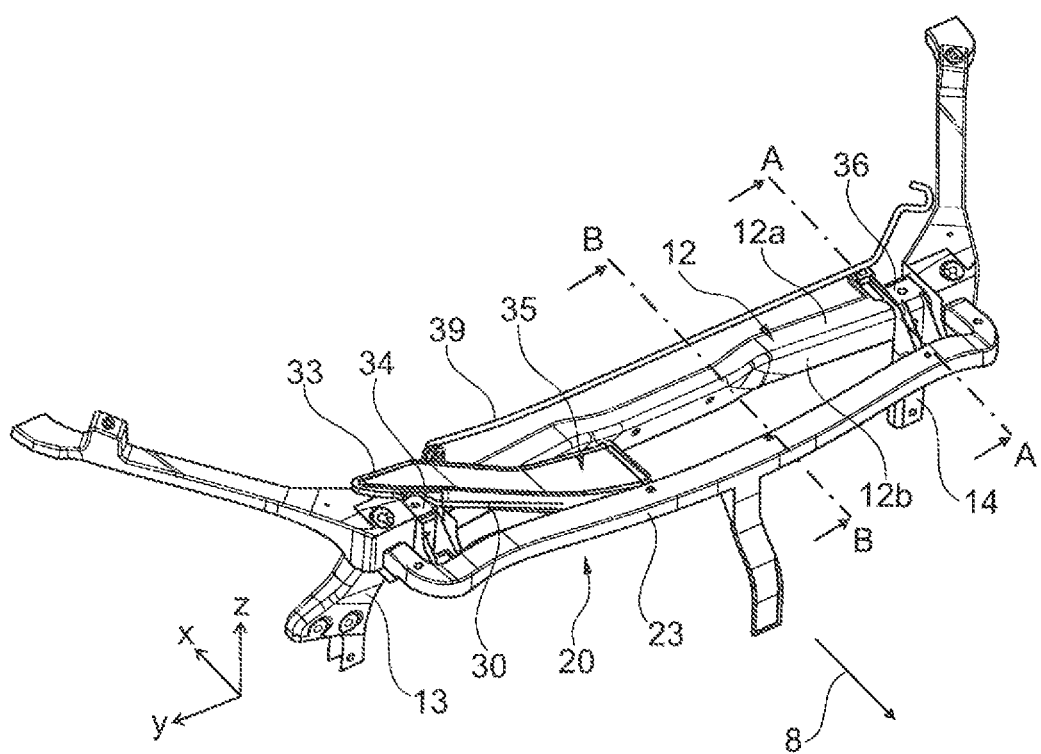
FIG. 8 is another view of the plastic component carrier with an upper cross member previously mounted thereon.

Fastening sections 24, 26 of the integrally designed plastic component carrier 20 are also connected directly to each other via a yoke-like connecting section 23. Connecting section 23 is arranged in front of upper cross member 12 with reference to the direction of travel of motor vehicle 1. Connecting section 23 is also arranged at a distance from upper cross member 12, so that in the final mounting configuration as shown in FIG. 3 a certain clearance remains in the lengthwise direction of the vehicle (x), which may be used to accommodate an air intake 35 such as is shown in FIG. 8.

Connecting section 23 is constructed with an approximately C-shape profile and is positioned in the plane (x, y) defined by the lengthwise direction and the transverse direction of the vehicle, the upper and lower legs of the C-shaped form extending forwards in the lengthwise direction of the vehicle. However, other geometrically modified configurations of connecting section 23, and therewith of plastic component carrier 20 as a whole are conceivable depending on the respective installation space specifications.

A downwardly projecting support 25 is disposed approximately in the middle of connecting section 23. The support is typically constructed as a single part with connecting section 23. Support 25 serves to support connecting section 23 approximately in the middle of bumper cross member 16, shown in FIG. 3. With support 25, elongated connecting section 23 receives additional support and is thus also additional stabilization against load-induced deflection.

The design of the support and the stabilization and strength they afford makes it possible for component carrier 20 to be made almost entirely as a plastic part. Connecting section 23, which has the cross section of a C or U shape open at the bottom, can also be furnished with structurally reinforcing ribs or a corresponding honeycomb structure, which bears on the cross sectional profile thereof.

Plastic component carrier 20 also has two lateral stabilizers 21, 22, a left lateral stabilizer 22 and a right lateral stabilizer 21. Lateral stabilizers 21, 22 extend approximately diagonally outward and rearward from the respective left or right fastening section 26, 24 to wheel mounting struts 5, 7. As is shown in FIG. 4, the right lateral stabilizer 21 has an end section 31 that is structurally connectable to right wheel mounting strut 7. In a matching design, left lateral stabilizer 22 also has a free end section 32 at the end farthest from left fastening section 26, and this end is structurally connectable to left wheel mounting strut 5.

For the structural securing of lateral stabilizers 21, 22 to wheel mounting struts 5, 7, special mountings or similar fastening means may be provided or conformed on the wheel mounting strut, by means of which the lateral stabilizers 21, 22 can be detachably connected to wheel mounting struts 5, 7. Threaded connectors are particularly suitable for this purpose.

The downwardly and rearwardly inclined lateral stabilizers 21, 22 may also provide a structural connection between upper cross member 12 and wheel mounting struts 5, 7. For this purpose, it may be advantageous is lateral stabilizers 21, 22 are structurally strengthened by the conformation of plastic ribbing or a corresponding honeycomb structure. As is shown in FIG. 4, the lateral stabilizers 21, 22 may have the profile of a C or U shape that is open at the bottom, and the interior of which is furnished with corresponding reinforcing structures.

Figure 7:
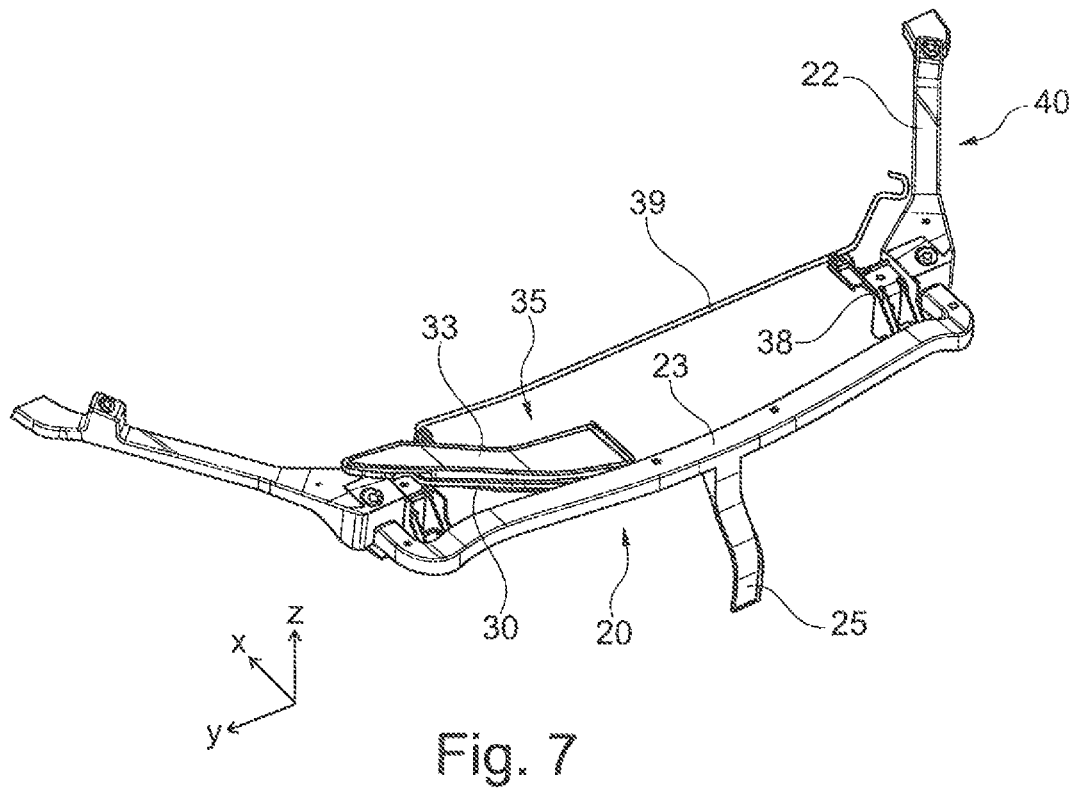
FIG. 7 is another perspective view of the plastic component carrier with hood rod and air intake mounted.

Instead of or in addition to the above, it is also conceivable for the lateral stabilizers 21, 22 to be structurally strengthened with metal inserts 40 or metal attachments, the presence of which is only suggested in FIG. 7. Since the free end sections 31, 32 of lateral stabilizers 21, 22 are connected on one side to wheel mounting struts 7, 5 and on the other side directly to upper cross member 12 via the fastening sections 24, 26 conformed integrally therewith, lateral stabilizers 21, 22 can thus help to make the entire front mounting 10 stiffer and stronger, and generally increase the torsional rigidity of the motor vehicle body 2.

Figure 5:
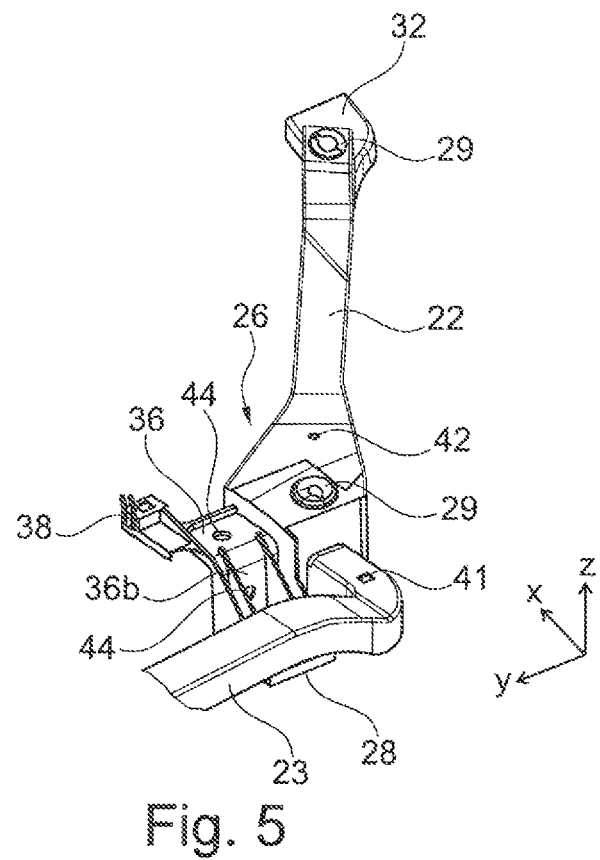
FIG. 5 is an enlarged view of the left fastening section of the plastic component carrier.
Figure 6:
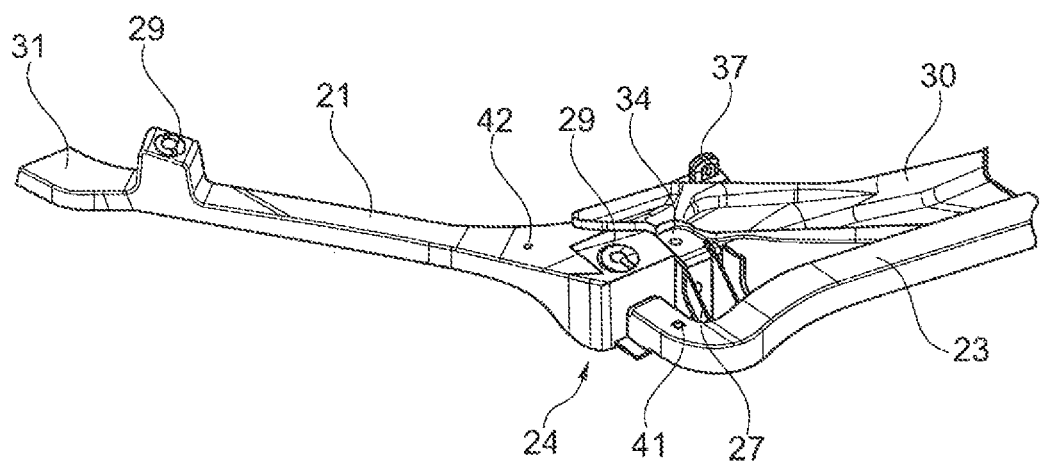
FIG. 6 is an enlarged perspective view of the right lateral stabilizer of the plastic component carrier.
Figure 9:
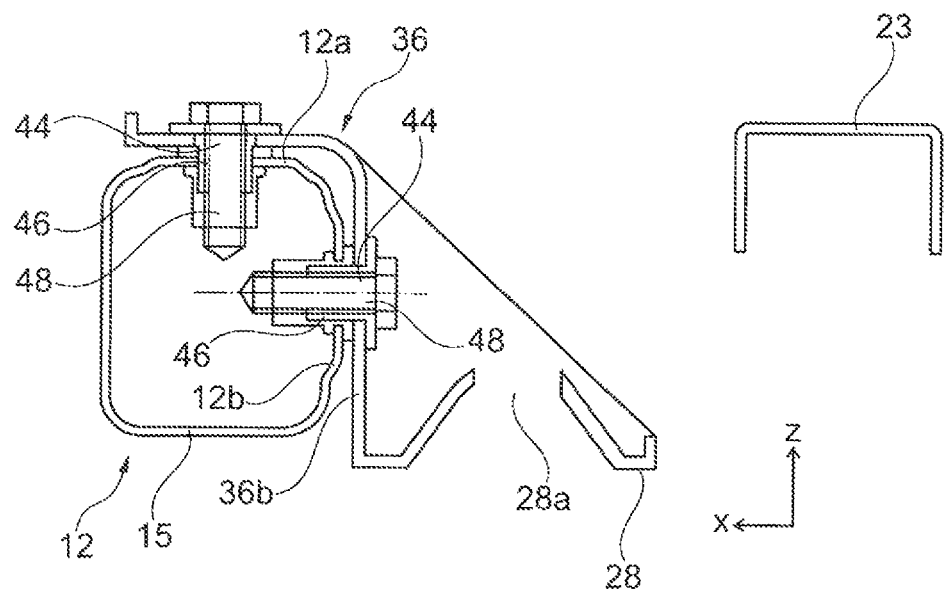
FIG. 9 shows a cross section along line A-A in FIG. 8.

As is also evident from FIGS. 3 and 8, the left and right fastening sections 26, 24 of plastic component carrier 20 may enclose upper cross member 12 between themselves when viewed in the transverse direction of the vehicle (y). For the reciprocal connection between plastic component carrier and upper cross member 12, each of fastening sections 24, 26 includes a fastening bracket 34, 36, which bears on both an upper side 12a, and a front side 12b of upper cross member 12, as is shown in FIG. 9. Fastening brackets 34, 36 may be furnished with screw holes 44, as shown in FIGS. 5 and 9 which are positioned to overlap the screw holes 46 in upper cross member 12 that are arranged oppositely and correspondingly. As is shown in FIG. 9 for example, fastening bracket 36 may be screwed to both the front side 12b and the top side 12a of upper cross member 12 with the aid of two screws 48.

As is also shown in FIG. 9, a radiator mounting 28 projects forward in direction of travel 8 from a front leg 36b of fastening bracket 36. Radiator mounting 28 has a pass-through aperture 28a for securing a motor vehicle radiators, which does not appear explicitly in the figures.

The plastic component carrier 20, which is designed as a one-piece injection molded component, may also be furnished with an air intake 35, or more precisely with a lower shell 30 of an air intake 35, as illustrated in FIGS. 4, 6, 7 and 8. In this context, at least the lower shell of air intake 35 may be formed as a single part with connecting section 23 as well as with right fastening section 24, and in this way integrated in plastic component carrier 20.

After fitting in or on the front mounting 10 or after prefitting with upper cross member 12, an upper shell 33 of air intakes 35 may then immediately be connected to lower shell 30 of air intake 35, by means of clips for example, to form an essentially sealed air duct.

Plastic component carrier 20 further includes various holders 29 for rubber hood buffers and the like. Holders 29 are conformed as raised sockets for example close to the free end sections 31, 32 of lateral stabilizers 21, 22. Fastening sections 24, 26 may also be furnished separately with a holder 29 of such kind. And at least one additional connecting section 42, in the form of a pass-through aperture may be provided on each of the left and right lateral stabilizers 20, 21 and may be used to connect and secure a headlamp module—not shown explicitly in the figures.

Left fastening section 26 is also provided with a mounting 38 in the form of a hood rod holder, while the opposite, right fastening section 24 has a holder 37 designed as a pivot bearing 37 for hood rod 39. In this context, an attachment 39 is designed as a hood rod, which is supported in holder 37 so as to be pivotable or rotatable, and the opposite end section of which can be secured in holder 38, as shown in FIG. 8.

Figure 10:
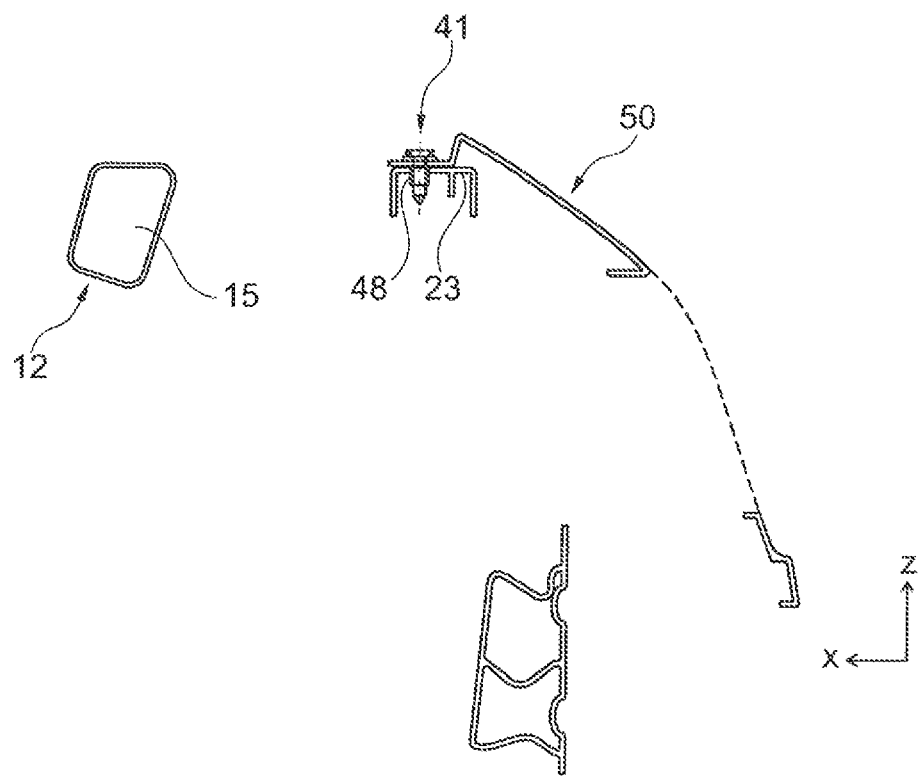
FIG. 10 shows a cross section along line B-B in FIG. 8.

Finally, as may be seen in the cross section in FIG. 10, connecting section 23 of plastic component carrier 20 assures the connection and fastening of a bumper cladding panel 50. As shown in FIG. 10, the panel rests on a top side of connecting section 23 and can be secured detachably with screws 48, via fastening points 41 provided at intervals over the length of connecting section 23, and thus also detachably to plastic component carrier 20.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A front mounting of a motor vehicle body, comprising:
   a left and a right side member, each of which extends in a lengthwise vehicle direction;
   a lock cross member extending in a transverse vehicle direction, and connected to the left and the right side members; and
   an elongated connecting section positioned between left and right fastening sections and constructed integrally therewith, wherein the left and the right fastening sections indirectly or directly connect or fasten the elongated connecting section to the left and the right side members, wherein the elongated connecting section is located ahead of the upper cross member with reference to a forward direction of travel of the motor vehicle body, and wherein the left and the right fastening sections each comprise a radiator mounting.

2. The front mounting according to claim 1, wherein the elongated connecting section comprises a support extending in the vertical direction of the vehicle (z) and configured to brace against a bumper cross member.

3. The front mounting according to claim 2, wherein the support is constructed as a single part with the connecting section and is arranged centrally between the left and right fastening sections.

4. The front mounting according to claim 1, wherein the plastic component carrier has a right and left lateral stabilizer, each of which extends outward from the respective right and left connecting sections, wherein the right and left lateral stabilizers are configured to respectively fastened to left and right wheel mounting struts via an end section farthest from the left and right fastening sections.

5. The front mounting according to claim 1, wherein the left and right fastening sections of the plastic component carrier are connected to the side members via the upper cross member, and enclose at least a portion of an edge of the upper cross member.

6. The front mounting according to claim 1, wherein the left and right fastening sections each comprise a fastening bracket braced against a top side and a front side of the upper cross member.

7. The front mounting according to claim 1, wherein the radiator mounting is constructed as an extension protruding from bottom edges of the left and right fastening bracket.

8. The front mounting according to claim 1, further comprising an air intake housing, wherein at least a part of the air intake housing is configured to conform to the connecting section.

9. The front mounting according to claim 1, wherein the connecting section comprises a plurality of fastening points for a bumper cladding panel.

10. The front mounting according to claim 1, wherein the plastic component carrier comprises a plurality of mounts configured to support an attachment.

11. The front mounting according to claim 1, wherein the plastic component carrier comprises a plurality of connecting sections configured to support an attachment.

12. The front mounting according to claim 1, wherein the plastic component carrier is constructed as an injection molded plastic part.

13. A motor vehicle body comprising a front mounting according to claim 1.

14. A motor vehicle comprising a motor vehicle body according to claim 13.

15. A front mounting of a motor vehicle body, comprising:
   a lock cross member extending in a transverse vehicle direction, which is connected to a left and a right side member, each of which extends in a lengthwise direction of the vehicle; and
   an elongated plastic component carrier constructed as a single part, and which is directly or indirectly connected or fastened by a left and a right fastening section to the side members, and which further comprises an elongated connecting section positioned between the left and the right fastening sections and constructed integrally therewith, which the elongated connection section is located ahead of the lock cross member with reference to a forward direction of the motor vehicle body and wherein the connecting section comprises a support extending in a vertical direction of the vehicle for bracing against a bumper cross member.

16. The front mounting according to claim 15, wherein the support is constructed as a single part with the connecting section and is arranged centrally between the fastening sections.

17. The front mounting according claim 15, wherein the plastic component carrier has a right and a left lateral stabilizer, each of which extends outward from the respective right and left connecting section, and each of which can be fastened to left and right wheel mounting struts via an end sections farthest from the fastening section.

19. The front mounting according to claim 15, wherein the fastening sections of the plastic component carrier are connected to the side members via the lock cross member, and enclose at least sections of the edge of the lock cross member.

19. The front mounting according to claim 15, wherein the fastening sections each comprise a fastening bracket, each fastening bracket is braced against a top side and a front side of the lock cross member.

20. The front mounting according to claim 15, wherein at least a part of an air intake is conformed on the connecting section.

* * * * *